UNITED STATES PATENT OFFICE.

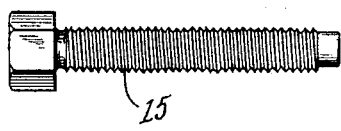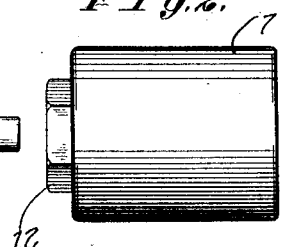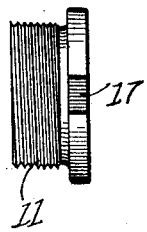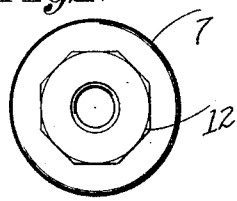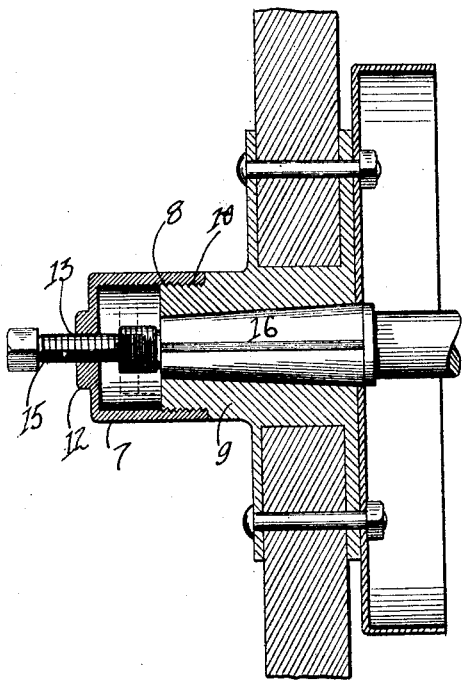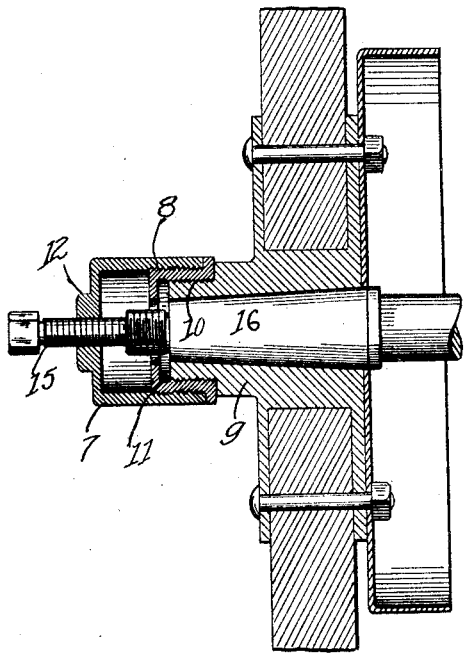

MYRL M. SAUERS, OF SANTA CRUZ, CALIFORNIA.

WHEEL PULLER.

1,416,578.   Specification of Letters Patent.   Patented May 16, 1922.

Application filed February 19, 1921. Serial No. 446,329.

*To all whom it may concern:*

Be it known that I, MYRL M. SAUERS, a citizen of the United States, residing at Santa Cruz, in the county of Santa Cruz and State of California, have invented new and useful Improvements in Wheel Pullers, of which the following is a specification.

This invention relates to a device for detaching wheels from spindles and while particularly intended for use in automobile work, it is to be understood that the device is not restricted to this use.

The principal object of this invention is to provide a device of the character described which comprises interchangeable parts, thereby making the tool applicable to various types or to vehicles whether they be automobiles proper or those of the truck type.

A further object of this invention is to provide screw means in combination with the puller proper, which means is so mounted with relation to the wheel axle as to facilitate the extraction of the vehicle wheel from its axle.

Other objects and advantages will be apparent during the course of the following description:

In the accompanying drawings forming a part of this specification and in which like numerals are employed to designate like parts throughout the same, Figure 1 is a side elevation of a screw member forming part of my invention, Figure 2 is a side elevation of the casing or body portion of the puller, Figure 3 is a side elevation of a bushing forming part of my invention, Figure 4 is a front elevation of the casing, Figure 5 is a central longitudinal section through the device showing its application to a wheel and hub of the truck type of automobile and Figure 6 is a central longitudinal section through the device showing its application to a wheel and hub of the other types of automobile.

In the accompanying drawings wherein for the purpose of illustration is shown a preferred embodiment of my invention, the numeral 7 designates a substantially cylindrical casing or body portion having one end thereof internally threaded as at 8 and adapted to be either directly threaded on the threads 10 of the hub 9 of a vehicle wheel or threaded on the external threads of a bushing 11, which is in turn readily threaded on the hub 9.

As shown to advantage in Figures 5 and 6, the casing 7 terminates at the extremity opposite to the internal threaded end 8 in a nut-like portion 12 having an opening 13 formed therein. Through this opening 13, a screw 15 is adapted to extend and upon movement contact with the end axle 16 so as to force the wheel of the vehicle end-wise with respect to the axle. Should the initial contact of the screw 15 with the end of the axle fail to dislodge the wheel, a blow or tapping on the exposed end of the screw will be transmitted to the axle and the wheel may then be readily pulled therefrom. For the purpose of facilitating the extraction of the bushing 11 when it is applied, as shown to advantage in Figure 6, I have provided on the bushing, notches 17 adapted to receive therein a spanner wrench.

This device as will be apparent is intended for use on the rear wheels of a vehicle, and in utilizing the tool on a vehicle of the truck type, it is necessary to remove the hub cap and associated cotter pin and nut. A body or casing of the puller, as shown to advantage in Figure 5 is first threaded on the wheel hub 9. The screw member 15 is then moved into contacting position with the end of the axle shaft and blows on the exposed end of the screw will serve to loosen the wheel from the shaft. A consequent further tightening of the screw will afford an easy manual extraction of the wheel.

When the device is applied to an automobile of the touring or roadster type, the bushing 11 is first positioned in the body of the casing and the same action is repeated as set forth in the process of extracting the wheel from the truck type of automobile.

It is to be understood that the form of my invention herewith shown and described, is to be taken as a preferred example of the same and that various changes in the shape, size and arrangement of parts may be resorted to without departing from the spirit of the invention, or the scope of the subjoined claim.

Having thus described my invention I claim:—

A wheel puller including, a bushing provided with external and internal threads thereon and adapted to be positioned on the hub of a vehicle wheel, a casing having threaded engagement with said bushing, and an axle forcing screw entering said casing and adapted to receive blows and impart the force thereof to the end of the axle of the wheel to be pulled.

In testimony whereof I affix my signature.

MYRL M. SAUERS.